(12) United States Patent
Lu

(10) Patent No.: US 11,567,875 B2
(45) Date of Patent: *Jan. 31, 2023

(54) INTEGRATED CIRCUIT AND ADDRESS MAPPING METHOD FOR CACHE MEMORY

(71) Applicant: Taiwan Semiconductor Manufacturing Company, Ltd., Hsinchu (TW)

(72) Inventor: Shih-Lien Linus Lu, Hsinchu (TW)

(73) Assignee: Taiwan Semiconductor Manufacturing Company, Ltd., Hsinchu (TW)

(*) Notice: Subject to any disclaimer, the term of this patent is extended or adjusted under 35 U.S.C. 154(b) by 8 days.

This patent is subject to a terminal disclaimer.

(21) Appl. No.: 17/227,063

(22) Filed: Apr. 9, 2021

(65) Prior Publication Data
US 2021/0224193 A1 Jul. 22, 2021

Related U.S. Application Data

(63) Continuation of application No. 16/667,054, filed on Oct. 29, 2019, now Pat. No. 10,977,178, which is a (Continued)

(51) Int. Cl.
*G06F 12/0864* (2016.01)
*G06F 11/14* (2006.01)
*G06F 12/0846* (2016.01)

(52) U.S. Cl.
CPC ...... *G06F 12/0864* (2013.01); *G06F 11/1423* (2013.01); *G06F 12/0846* (2013.01);
(Continued)

(58) Field of Classification Search
None
See application file for complete search history.

(56) References Cited

U.S. PATENT DOCUMENTS 7,376,807 B2 5/2008 Moyer
10,248,571 B2 4/2019 Lesartre et al.
(Continued)

OTHER PUBLICATIONS

Brown et al., "Fundamental of Digital Logic with Verilog Design", 2003, McGraw Hill, pp. 320-331.
(Continued)

*Primary Examiner* — Nathan Sadler
(74) *Attorney, Agent, or Firm* — Birch, Stewart, Kolasch & Birch, LLP

(57) ABSTRACT

An integrated circuit (IC) is provided. The IC includes a cache memory divided into a plurality of groups and an address decoder. The groups are assigned in rotation for a plurality of time periods. Each group is assigned in a corresponding single one of the time periods. The address decoder is configured to obtain a set address according to an access address and provide a physical address according to the set address. When the access address corresponds to a first group, the physical address is different from the set address. When the access address corresponds to the groups other than the first group, the physical address is the same as the set address. The sets of the first group that is assigned in a first time period are not overlapping with the sets of other first groups assigned in the time periods other than the first time period.

20 Claims, 12 Drawing Sheets

Related U.S. Application Data continuation of application No. 15/370,113, filed on Dec. 6, 2016, now Pat. No. 10,503,649.

(60) Provisional application No. 62/427,069, filed on Nov. 28, 2016.

(52) U.S. Cl.
CPC ........... *G06F 2212/1016* (2013.01); *G06F 2212/1032* (2013.01); *G06F 2212/601* (2013.01); *G06F 2212/608* (2013.01)

(56) References Cited

U.S. PATENT DOCUMENTS

| | | | |
|---|---|---|---|
| 10,503,649 B2 | 12/2019 | Lu | |
| 10,977,178 B2 * | 4/2021 | Lu | G06F 11/1423 |
| 2009/0103203 A1 | 4/2009 | Yoshida | |
| 2012/0297110 A1 | 11/2012 | Kavi | |
| 2014/0237160 A1 | 8/2014 | Dong | |
| 2015/0039967 A1 | 2/2015 | Romanovskyy | |
| 2016/0313930 A1 | 10/2016 | Harrand et al. | |

OTHER PUBLICATIONS

Calimera et al., "Dynamic Indexing: Concurrent Leakage and Aging Optimization for Caches", Aug. 2010, ACM, ISLPED '10, pp. 343-348.

Calimera et al., "Partitioned Cache Architectures for Reduced NBTI-Induced Aging", Mar. 2011, IEEE.

Chen et al., "On-Chip Caches Built on Multilevel Spin-Transfer Torque RAM Cells and its Optimizations", May 2013, ACM, ACM Journal on Emerging Technologies in Computing Systems, vol. 9.

Foncesca et al., "On Using Address Scrambling to Implement Defect Tolerance in SRAMs", Sep. 2011, IEEE, International Test Conference.

Gunadi et al., "Combating Aging with the Colt Duty Cycle Equalizer", Dec. 2010, IEEE, Micro 2010.

Loghi et al., "Energy-Optimal Caches with Guaranteed Lifetime", Aug. 2012, ACM, ISLPED '12, pp. 141-146.

Mittal, Sparsh, "Using Cache-coloring to Mitigate Inter-set Write Variation in Non-volatile Caches", http://arxiv.org/pdf/1310.8494.

Patterson et al., "Computer Organization and Design", 2014, Morgan Kaufmann, 5th Edition, pp. 407-409.

Wang et al., "i2WAP: Improving Non-Volatile Cache Lifetime by Reducing Inter- and Intra-set Write Variations", Feb. 2013, IEEE, HPCA 2013.

Wilton et al., "CACTI: An Enhanced Cache Access and Cycle Time Model", May 1936, IEEE, IEEE Journal of Solid-State Circuits, vol. 31. pp 677-688.

Jokar et al. "Sequioa: A High-Endurance NVM-Based Cache Architecture." Mar. 2016. IEEE. IEEE Transactions on VLSI Systems. vol. 24. pp. 954-967.

Soltani et al. "Prolonging Lifetime of Non-volatile Last Level Caches with Cluster Mapping." May 2016. ACM. GLSVLSI '16. pp. 329-334.

\* cited by examiner

| ADDR_set[3:0] | ROW[15:0] |
|---|---|
| 0000  (set_0) | 0000000000000001  (row_0) |
| 0001  (set_1) | 0000000000000010  (row_1) |
| 0010  (set_2) | 0000000000000100  (row_2) |
| 0011  (set_3) | 0000000000001000  (row_3) |
| 0100  (set_4) | 0000000000010000  (row_4) |
| 0101  (set_5) | 0000000000100000  (row_5) |
| 0110  (set_6) | 0000000001000000  (row_6) |
| 0111  (set_7) | 0000000010000000  (row_7) |
| 1000  (set_8) | 0000000100000000  (row_8) |
| 1001  (set_9) | 0000001000000000  (row_9) |
| 1010  (set_10) | 0000010000000000  (row_10) |
| 1011  (set_11) | 0000100000000000  (row_11) |
| 1100  (set_12) | 0001000000000000  (row_12) |
| 1101  (set_13) | 0010000000000000  (row_13) |
| 1110  (set_14) | 0100000000000000  (row_14) |
| 1111  (set_15) | 1000000000000000  (row_15) |

FIG. 6A

| ADDR_set[3:0] | ADDR_map[3:0] = ADDR_set[3:0]+"1" | ROW[15:0] |
|---|---|---|
| 0000 (set_0) | 0001 | 0000000000000010 (row_1) |
| 0001 (set_1) | 0010 | 0000000000000100 (row_2) |
| 0010 (set_2) | 0011 | 0000000000001000 (row_3) |
| 0011 (set_3) | 0100 | 0000000000010000 (row_4) |
| 0100 (set_4) | 0101 | 0000000000100000 (row_5) |
| 0101 (set_5) | 0110 | 0000000001000000 (row_6) |
| 0110 (set_6) | 0111 | 0000000010000000 (row_7) |
| 0111 (set_7) | 1000 | 0000000100000000 (row_8) |
| 1000 (set_8) | 1001 | 0000001000000000 (row_9) |
| 1001 (set_9) | 1010 | 0000010000000000 (row_10) |
| 1010 (set_10) | 1011 | 0000100000000000 (row_11) |
| 1011 (set_11) | 1100 | 0001000000000000 (row_12) |
| 1100 (set_12) | 1101 | 0010000000000000 (row_13) |
| 1101 (set_13) | 1110 | 0100000000000000 (row_14) |
| 1110 (set_14) | 1111 | 1000000000000000 (row_15) |
| 1111 (set_15) | 0000 | 0000000000000001 (row_0) |

FIG. 6B

| ADDR_set[3:0] | ADDR_map[3:0] = ADDR_set[3:0] XOR "0001" | ROW[15:0] |
|---|---|---|
| 0000 (set_0) | 0001 | 0000000000000010 (row_1) |
| 0001 (set_1) | 0000 | 0000000000000001 (row_0) |
| 0010 (set_2) | 0011 | 0000000000001000 (row_3) |
| 0011 (set_3) | 0010 | 0000000000000100 (row_2) |
| 0100 (set_4) | 0101 | 0000000000100000 (row_5) |
| 0101 (set_5) | 0100 | 0000000000010000 (row_4) |
| 0110 (set_6) | 0111 | 0000000010000000 (row_7) |
| 0111 (set_7) | 0110 | 0000000001000000 (row_6) |
| 1000 (set_8) | 1001 | 0000001000000000 (row_9) |
| 1001 (set_9) | 1000 | 0000000100000000 (row_8) |
| 1010 (set_10) | 1011 | 0000100000000000 (row_11) |
| 1011 (set_11) | 1010 | 0000010000000000 (row_10) |
| 1100 (set_12) | 1101 | 0010000000000000 (row_13) |
| 1101 (set_13) | 1100 | 0001000000000000 (row_12) |
| 1110 (set_14) | 1111 | 1000000000000000 (row_15) |
| 1111 (set_15) | 1110 | 0100000000000000 (row_14) |

FIG. 8A

| ADDR_set[3:0] | ADDR_map[3:0] = ADDR_set[3:0] XOR "0010" | ROW[15:0] |
|---|---|---|
| 0000 (set_0) | 0010 | 0000000000000100 (row_2) |
| 0001 (set_1) | 0011 | 0000000000001000 (row_3) |
| 0010 (set_2) | 0000 | 0000000000000001 (row_0) |
| 0011 (set_3) | 0001 | 0000000000000010 (row_1) |
| 0100 (set_4) | 0110 | 0000000001000000 (row_6) |
| 0101 (set_5) | 0111 | 0000000010000000 (row_7) |
| 0110 (set_6) | 0100 | 0000000000010000 (row_4) |
| 0111 (set_7) | 0101 | 0000000000100000 (row_5) |
| 1000 (set_8) | 1010 | 0000010000000000 (row_10) |
| 1001 (set_9) | 1011 | 0000100000000000 (row_11) |
| 1010 (set_10) | 1000 | 0000000100000000 (row_8) |
| 1011 (set_11) | 1001 | 0000001000000000 (row_9) |
| 1100 (set_12) | 1110 | 0100000000000000 (row_14) |
| 1101 (set_13) | 1111 | 1000000000000000 (row_15) |
| 1110 (set_14) | 1100 | 0001000000000000 (row_12) |
| 1111 (set_15) | 1101 | 0010000000000000 (row_13) |

FIG. 8B

| ADDR_set[3:0] | ADDR_map[3:0] = ADDR_set[3:0] XOR "0100" | ROW[15:0] |
|---|---|---|
| 0000 (set_0) | 0100 | 0000000000010000 (row_4) |
| 0001 (set_1) | 0101 | 0000000000100000 (row_5) |
| 0010 (set_2) | 0110 | 0000000001000000 (row_6) |
| 0011 (set_3) | 0111 | 0000000010000000 (row_7) |
| 0100 (set_4) | 0000 | 0000000000000001 (row_0) |
| 0101 (set_5) | 0001 | 0000000000000010 (row_1) |
| 0110 (set_6) | 0010 | 0000000000000100 (row_2) |
| 0111 (set_7) | 0011 | 0000000000001000 (row_3) |
| 1000 (set_8) | 1100 | 0001000000000000 (row_12) |
| 1001 (set_9) | 1101 | 0010000000000000 (row_13) |
| 1010 (set_10) | 1110 | 0100000000000000 (row_14) |
| 1011 (set_11) | 1111 | 1000000000000000 (row_15) |
| 1100 (set_12) | 1000 | 0000000100000000 (row_8) |
| 1101 (set_13) | 1001 | 0000001000000000 (row_9) |
| 1110 (set_14) | 1010 | 0000010000000000 (row_10) |
| 1111 (set_15) | 1011 | 0000100000000000 (row_11) |

FIG. 8C

| ADDR_set[3:0] | ADDR_map[3:0] = ADDR_set[3:0] XOR "1000" | ROW[15:0] |
|---|---|---|
| 0000 (set_0) | 1000 | 0000000100000000 (row_8) |
| 0001 (set_1) | 1001 | 0000001000000000 (row_9) |
| 0010 (set_2) | 1010 | 0000010000000000 (row_10) |
| 0011 (set_3) | 1011 | 0000100000000000 (row_11) |
| 0100 (set_4) | 1100 | 0001000000000000 (row_12) |
| 0101 (set_5) | 1101 | 0010000000000000 (row_13) |
| 0110 (set_6) | 1110 | 0100000000000000 (row_14) |
| 0111 (set_7) | 1111 | 1000000000000000 (row_15) |
| 1000 (set_8) | 0000 | 0000000000000001 (row_0) |
| 1001 (set_9) | 0001 | 0000000000000010 (row_1) |
| 1010 (set_10) | 0010 | 0000000000000100 (row_2) |
| 1011 (set_11) | 0011 | 0000000000001000 (row_3) |
| 1100 (set_12) | 0100 | 0000000000010000 (row_4) |
| 1101 (set_13) | 0101 | 0000000000100000 (row_5) |
| 1110 (set_14) | 0110 | 0000000001000000 (row_6) |
| 1111 (set_15) | 0111 | 0000000010000000 (row_7) |

FIG. 8D

INTEGRATED CIRCUIT AND ADDRESS MAPPING METHOD FOR CACHE MEMORY

CROSS REFERENCE TO RELATED APPLICATIONS

This Application is a Continuation of application Ser. No. 16/667,054, filed on Oct. 29, 2019, now U.S. Pat. No. 10,977,178, which is a Continuation of application Ser. No. 15/370,113, filed on Dec. 6, 2016, now U.S. Pat. No. 10,503,649, which claims priority of U.S. Provisional Application No. 62/427,069, filed on Nov. 28, 2016, the entirety of which are incorporated by reference herein.

BACKGROUND

A cache memory has conventionally been utilized for shortening the access time of main memory thus improving the processing performance of a processor. Cache is effective due to memory access locality. There are two types of locality. First there is the spatial locality where data and codes adjacent to each other tends to be accessed together. There is the temporal locality where data and code accessed commonly can be cached in a smaller memory for further accesses.

The extensive uses of on-chip cache memories have become essential to sustaining the memory bandwidth demand on processors and to reduce the average memory access latency. Advances in semiconductor technology and continuous downscaling of feature size creates extra-space for additional functionality on a single chip. The most popular way to make use of this extra space is to integrate a cache memory (or a hierarchy of caches) with high capacity so that a processor is able to perform better.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIG. 6A shows an example table illustrating a relationship between the set address and the row line signal of FIG. 5 when the accessed group is an unassigned group.

FIG. 6B shows an example table illustrating a relationship between the set address and the row line signal of FIG. 5 when the accessed group is the specific group (i.e. the assigned group).

FIG. 8A shows an example table illustrating a relationship between the set address and the row line signal of FIG. 7 when the accessed group is an unassigned group and the shift value is "0001".

FIG. 8B shows an example table illustrating a relationship between the set address and the row line signal of FIG. 7 when the accessed group is an unassigned group and the shift value is "0010".

FIG. 8C shows an example table illustrating a relationship between the set address and the row line signal of FIG. 7 when the accessed group is an unassigned group and the shift value is "0100".

FIG. 8D shows an example table illustrating a relationship between the set address and the row line signal of FIG. 7 when the accessed group is an unassigned group and the shift value is "1000".

DETAILED DESCRIPTION

Figure 1:
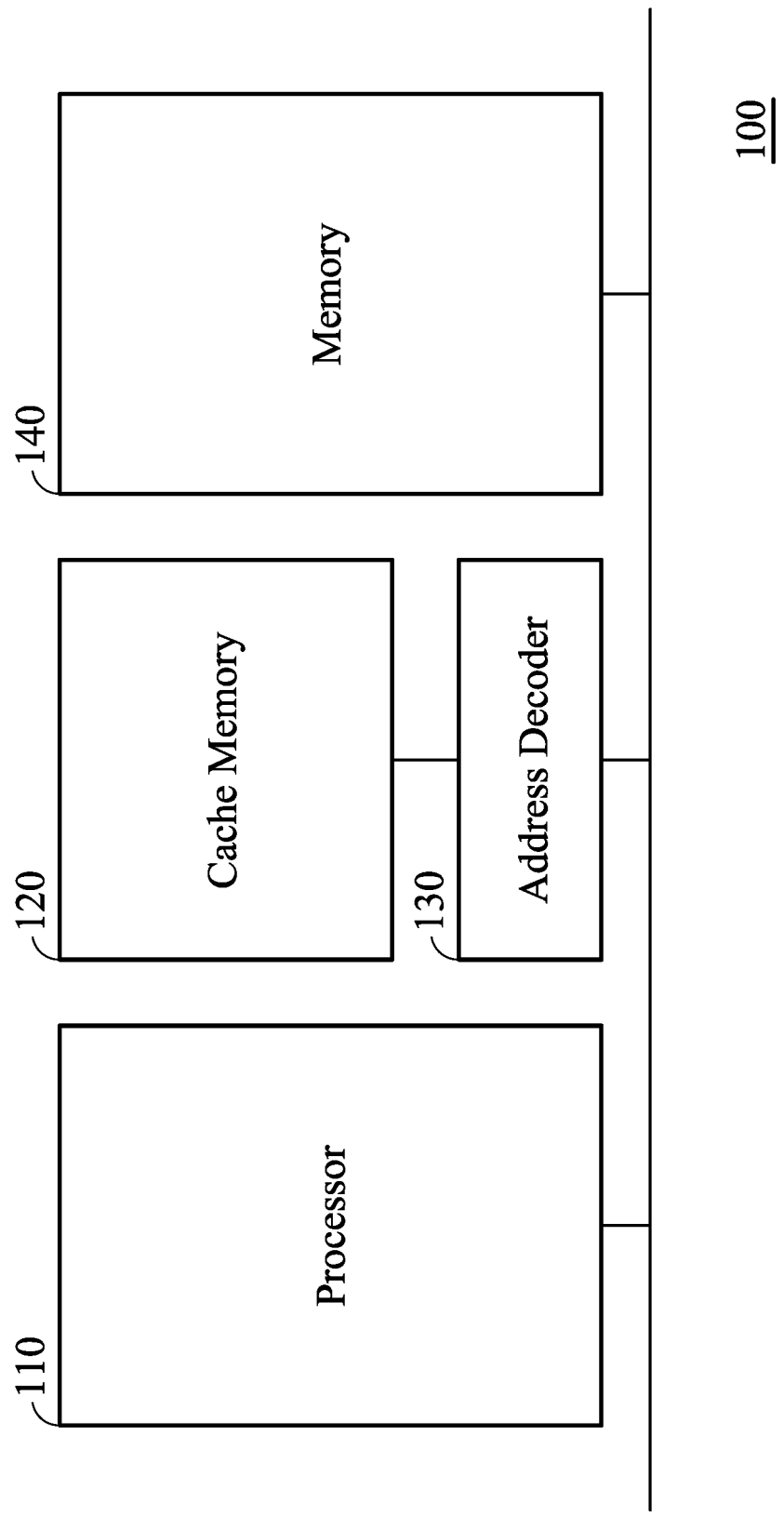
FIG. 1 shows an integrated circuit (IC), in accordance with some embodiments of the disclosure.

The following disclosure provides many different embodiments, or examples, for implementing different features of the provided subject matter. Specific examples of components and arrangements are described below to simplify the present disclosure. These are, of course, merely examples and are not intended to be limiting. In some embodiments, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Some variations of the embodiments are described. Throughout the various views and illustrative embodiments, like reference numbers are used to designate like elements. It should be understood that additional operations can be provided before, during, and/or after a disclosed method, and some of the operations described can be replaced or eliminated for other embodiments of the method.

With technology scaling in semiconductor processes, more and more cache memories can be implemented on a chip with a processor, such as a central processing unit (CPU), a graphics processing unit (GPU) or an application processing unit (APU), to alleviate memory latency and bandwidth pressure. Cache memories employee set-associative organization where set address mapping is fixed throughout the life time of a part. Furthermore, certain sets of the cache memory may be hot. That is, these sets are frequently used, and it will cause uneven wear on some memory cells in the cache memory, thereby decreasing the life time of the cache memory.

Cache memory is fast and expensive. Traditionally, a cache memory is categorized as "levels" that describe its closeness and accessibility to a processor.

Level 1 (L1) cache memory is extremely fast but relatively small, and a L1 cache memory may be embedded in a processor (e.g. CPU, GPU, APU, and the like).

Level 2 (L2) cache memory has more capacity than L1 cache memory. A L2 cache memory may be located on a processor or a separate chip or coprocessor with a high-speed alternative system bus interconnecting the L2 cache memory to the processor.

Level 3 (L3) cache memory is a specialized memory that is used to improve the performance of L1 cache memory and/or L2 cache memory. L3 cache memory can be significantly slower than the L1 or L2 cache memory, but is usually much faster than DRAM.

Configurations of cache memories continue to evolve, and the cache memory traditionally works under three different configurations: direct mapping, fully-associative mapping, and set-associative mapping.

For direct mapping, each block is mapped to exactly one location of the cache memory. Conceptually, each row of the cache memory is divided into three columns: the data block or cache line that includes the actual data fetched and stored, a tag that includes all or part of the address of the fetched data, and a flag bit that connotes the presence of a valid bit of data in the row direct-mapped.

For fully-associative mapping, it is similar to direct mapping in structure. Furthermore, it allows a block to be mapped to any cache location rather than to a pre-specified cache location (as is the case with direct mapping).

For set-associative mapping, it can be a compromise between direct mapping and fully-associative mapping, and each block is mapped to a set of cache locations. Sometimes, it is called N-way set-associative mapping, which provides for a location in main memory to be cached to any of "N" locations in the L1 cache memory.

The cache memory is divided into a plurality of sets, where each set includes a plurality of cache lines, i.e. N ways. Moreover, each memory address is assigned to a set, and can be cached in any one of those locations within the set that it is assigned to. Accordingly, there are "N" possible places that a given memory location may be in the cache memory. A tag RAM address decoder is used to identify which data from main memory is currently stored in each cache line. The values stored in the tag RAM is used to determine whether a cache lookup results in a hit or a miss.

FIG. 1 shows an integrated circuit (IC) 100, in accordance with some embodiments of the disclosure. The IC includes a processor 110, a cache memory 120, an address decoder 130, and a memory 140. In the embodiment, the memory 140 is a main memory in the IC 100. Furthermore, the memory 140 has a storage capacity greater than the cache memory 120.

The cache memory 120 is a random access memory (RAM) that the processor 110 can access more quickly. The cache memory 120 is used to store copies of data stored in the memory 140 that are frequently used by the processor 110. Therefore, the processor 110 can perform operations or tasks with the cache memory 120, to decrease operation time or power consumption of the IC. Specifically, the cache memory 120 is capable of storing program instructions and/or data that are frequently re-referenced by the processor 110 during operations, thereby increasing the overall speed of the operations. In some embodiments, memory type of the memory 140 (e.g. SRAM) is different from the memory type of the cache memory 120 (e.g. DRAM). In some embodiments, the memory type of the memory 140 is the same as the memory type of the cache memory 120.

In the IC 100, the processor 110 can access the cache memory 120 via the address decoder 130. The address decoder 130 is capable of decoding an address from the processor 110 to a physical location of the cache memory 120. Furthermore, the address decoder 130 is further capable of mapping the address to other physical location of the memory that is different from the physical location of the memory corresponding to the decoded address, thus avoiding that a cache line of the cache memory 120 being accessed always goes to the same physical location. If an access (from an address) is hot, that particular physical location will be accessed more frequently posing a potential challenge if the underlining memory cell has an endurance limit. By spreading the accesses evenly among the memory cells in the cache memory 120, the memory cells of the cache memory 120 are protected from high number of cycling in its life time. Therefore, endurance is increased for the cache memory 120. For example, when an operation is performed by the processor 110 to process data, the processor 110 will look the data first in the cache memory 120. If the processor 110 finds the data in the cache memory 120, the processor 110 does not have to do a more time-consuming further access of data from the larger memory (e.g. the memory 140) or other data storage devices in the IC 100.

Figure 2:
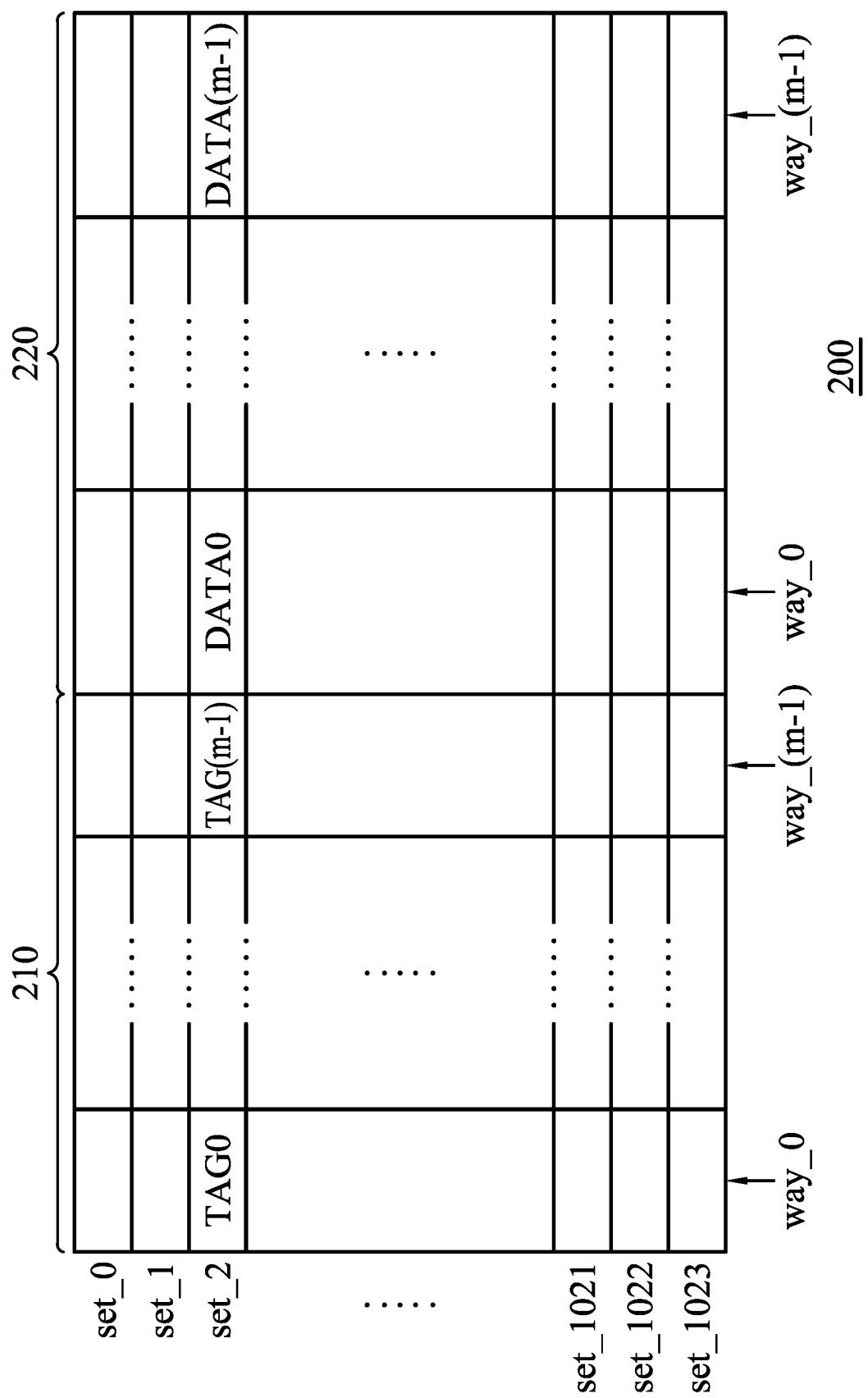
FIG. 2 shows a cache memory, in accordance with some embodiments of the disclosure.

FIG. 2 shows a cache memory 200, in accordance with some embodiments of the disclosure. The cache memory 200 includes a memory array formed by a plurality of memory cells, and the memory cells are arranged in a plurality of rows and a plurality of columns. Furthermore, the cache memory 200 is divided into two parts: a TAG directory 210 and a DATA array 220. As described above, the TAG directory 210 includes all or part of the address of the fetched data, and the DATA array 220 includes the actual data fetched and stored.

The cache memory 200 is organized as a set-associative structure, and the set-associative structure includes a plurality of sets set_0 to set_1023. In the embodiment, each set is arranged in an individual row. Furthermore, each set includes the corresponding tag directory 210 and the corresponding data array 220. For each set, the corresponding tag directory 210 includes a plurality of ways way_0 to way_(m−1), and the corresponding data array 220 also includes a plurality of ways way_0 to way_(m−1). It should be noted that the number of sets and the number of ways are provided as an example, and are not intended to limit the disclosure.

Each way is a cache line of a specific size with a plurality of bytes (e.g. 64B). Taking a cache memory of size 32 KB with line size 512B and 4-way set-associative organization as an example, the cache memory will have total 512 lines, and there will be total of 128 sets with 4 lines (4-way set-associative) in each set.

In some embodiments, when the cache memory 200 is accessed, the set address ADDR_set corresponding to the set to be accessed is determined in response to an access address ADDR from a processor (e.g. the processor 110). Next, the TAG directory 210 corresponding to the set to be accessed is looked up first to see if it is a cache hit, i.e. it is determined whether any way of the TAG directory 210 in the set to be accessed match TAG information of the access address ADDR. If it is a cache hit, the DATA array 220 corresponding to the set to be accessed is looked up, so as to obtain the cache data stored in the way of the DATA array 220 corresponding to the cache hit.

For example, if the access address ADDR indicates that the set set_2 is to be accessed, a plurality of tags TAG0 to TAG(m−1) stored in the ways way_0 to way_(m−1) of the set set_2 are read out to determine whether one of the tags TAG0 to TAG(m−1) is equal to the TAG information of the access address ADDR. If it is determined that the read tag TAG(m−1) of the way_(m−1) is equal to the TAG information of the access address ADDR, the data DATA(m−1) stored in the way way_(m−1) of the DATA array 220 of the set set_2 is read out.

Figure 3:
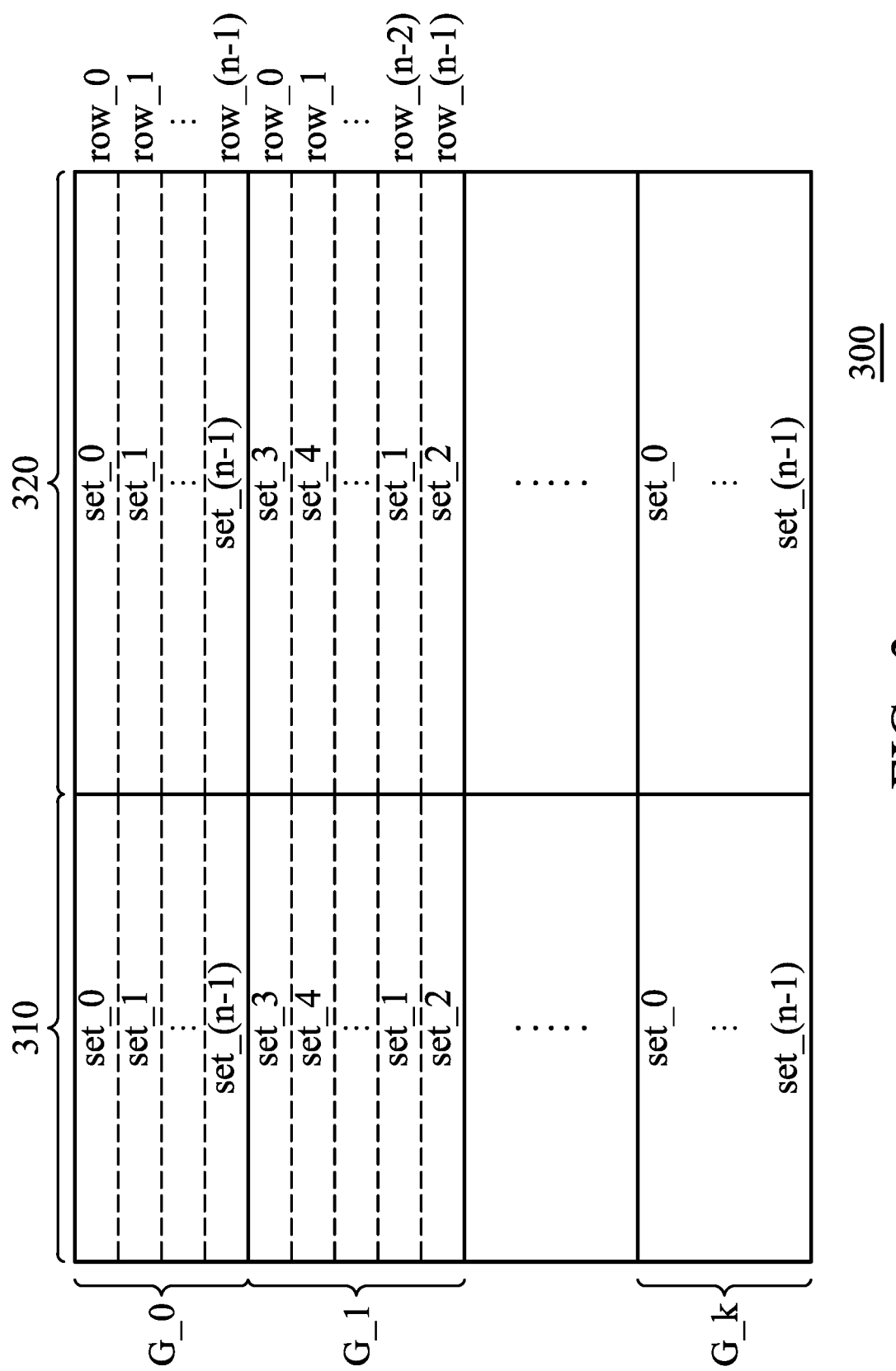
FIG. 3 shows a cache memory, in accordance with some embodiments of the disclosure.

FIG. 3 shows a cache memory 300, in accordance with some embodiments of the disclosure. The cache memory 300 includes a memory array formed by a plurality of memory cells, and the memory cells are arranged in a plurality of rows and a plurality of columns. Similarly, the cache memory 300 includes a TAG directory 310 and a DATA array 320.

In the cache memory 300, a plurality of sets (or rows) are divided into a plurality of groups G_0 to G_(k−1). Each of the groups G_0 to G_(k−1) includes the memory cells arranged in n consecutive rows row_0 to row_(n−1) of the array. In the embodiment, the groups G_0 to G_(k−1) have the same number of sets, e.g. each group has n sets. In some embodiments, the groups G_0 to G_(k−1) have a different number of sets.

When the cache memory 300 is accessed, a specific group is assigned or selected from the groups G_0 to G_(k−1). Simultaneously, the configuration of the sets in the specific group is adjusted so that the adjusted configuration of the sets is different from the regulation configuration of the sets in each group that is not the specific group. In some embodiments, the configuration of the sets in the specific group is changed periodically.

In the cache memory 300, only one group is assigned at a time. In some embodiments, the groups G_0 to G_(k−1) are respectively assigned in sequence or in rotation. For example, the group G_0 is assigned during a first time period P1, the group G_1 is assigned a second time period P2, . . . , and the group G_(k−1) is assigned during a kth time period Pk. After the group G_(k−1) (e.g. the last group) is assigned, the group G_0 is assigned during a $(k+1)^{th}$ time period P(k+1), the group G_1 is assigned during a $(k+2)^{th}$ time period P(k+2), and so on. In some embodiments, all groups G_0 to G_(k−1) are rotated through so that all physical locations will be mapped periodically.

For the assigned group, the sets are arranged in a first set order or an adjustable set order. Conversely, in the unassigned group (i.e. groups other than the specific group), the sets are arranged in a second set order or a fixed set order, e.g. a regular order from set_0 to set_(n−1) in sequence, and the second set order is different from the first set order. Therefore, the set address mapping configuration is changeable in the assigned group, i.e. the set order of the assigned group is configurable.

In FIG. 3, assuming that the group G_1 is assigned in the cache memory 300, the group G_1 is the assigned group, and the groups G_0, and G_2 to G_k are unassigned groups. In an unassigned group, the sets are arranged in a regular order from set_0 to set_(n−1) in sequence. In an assigned group, the sets are arranged in an order from set_3 to set_2, for example, set_3, set_4, set_5, . . . , set_(n−1), set_0, set_1, set_2 in sequence. Specifically, the set addresses of the assigned group G_1 are mapped.

Figure 4:
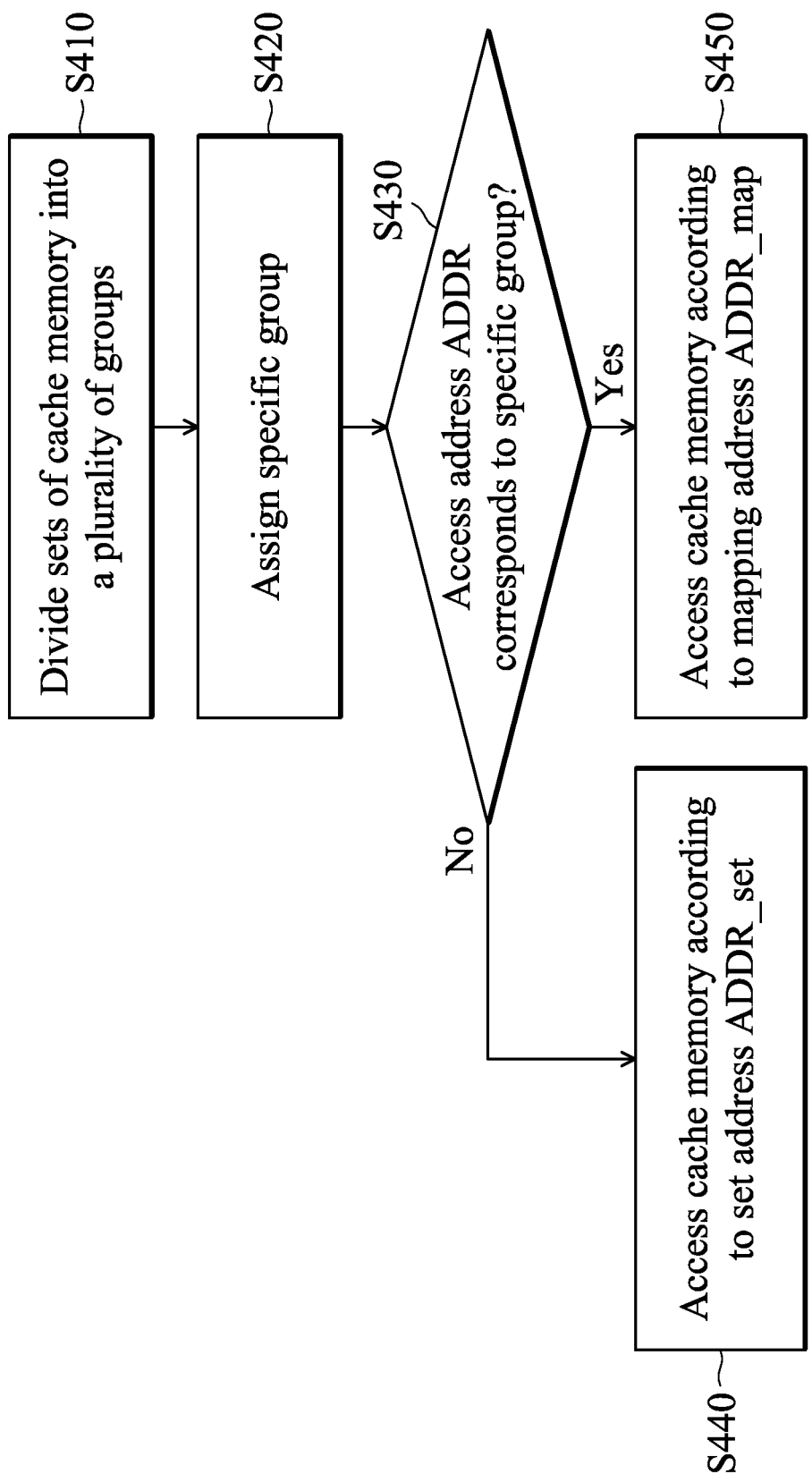
FIG. 4 shows a mapping method of a cache memory, in accordance with some embodiments of the disclosure.

FIG. 4 shows a mapping method of a cache memory (e.g. 120 of FIG. 1), in accordance with some embodiments of the disclosure.

In operation S410, a plurality of sets (or rows) of the cache memory are divided into a plurality of groups. In some embodiments, the groups have the same number of sets. In some embodiments, the groups have a different number of sets.

In operation S420, only a specific group of the groups is assigned at a time, so as to adjust the configuration of the sets of the specific group (i.e. the assigned group). Furthermore, any group other than the specific group is an unassigned group.

By mapping the set addresses of the specific group, the configuration of the sets is changed in the specific group. Moreover, only the specific group is mapped, thereby decreasing the impact on performance, since it only needs to flush the content of the assigned group rather than all the groups. In some embodiments, all the groups of the cache memory are assigned in rotation. It should be noted that the assignment of the groups is determined according to actual application.

In some embodiments, more than one group can be assigned to adjust the configuration of the sets of the assigned groups at a time.

In operation S430, when the cache memory is accessed, it is determined whether the access address ADDR corresponds to the specific group assigned in operation S420.

If it is determined that the access address ADDR does not correspond to the specific group, i.e. the access address ADDR corresponds to the unassigned group, the set address ADDR_set will not be mapped for the access address ADDR, and then the cache memory is accessed according to the set address ADDR_set (operation S440). As described above, the sets are arranged in a second set order or a fixed set order in each unassigned group. Therefore, the configurations of the sets are the same in the unassigned groups.

Conversely, if it is determined that the access address ADDR corresponds to the specific group, the set address ADDR_set will be mapped to obtain the mapping address ADDR_map for the access address ADDR, and then the cache memory is accessed according to the mapping address ADDR_map (operation S450). As described above, the sets are arranged in a first set order or an adjustable set order in the assigned group. Therefore, the configuration of the sets in the assigned group is different from the configuration of the sets in the unassigned groups.

Figure 5:
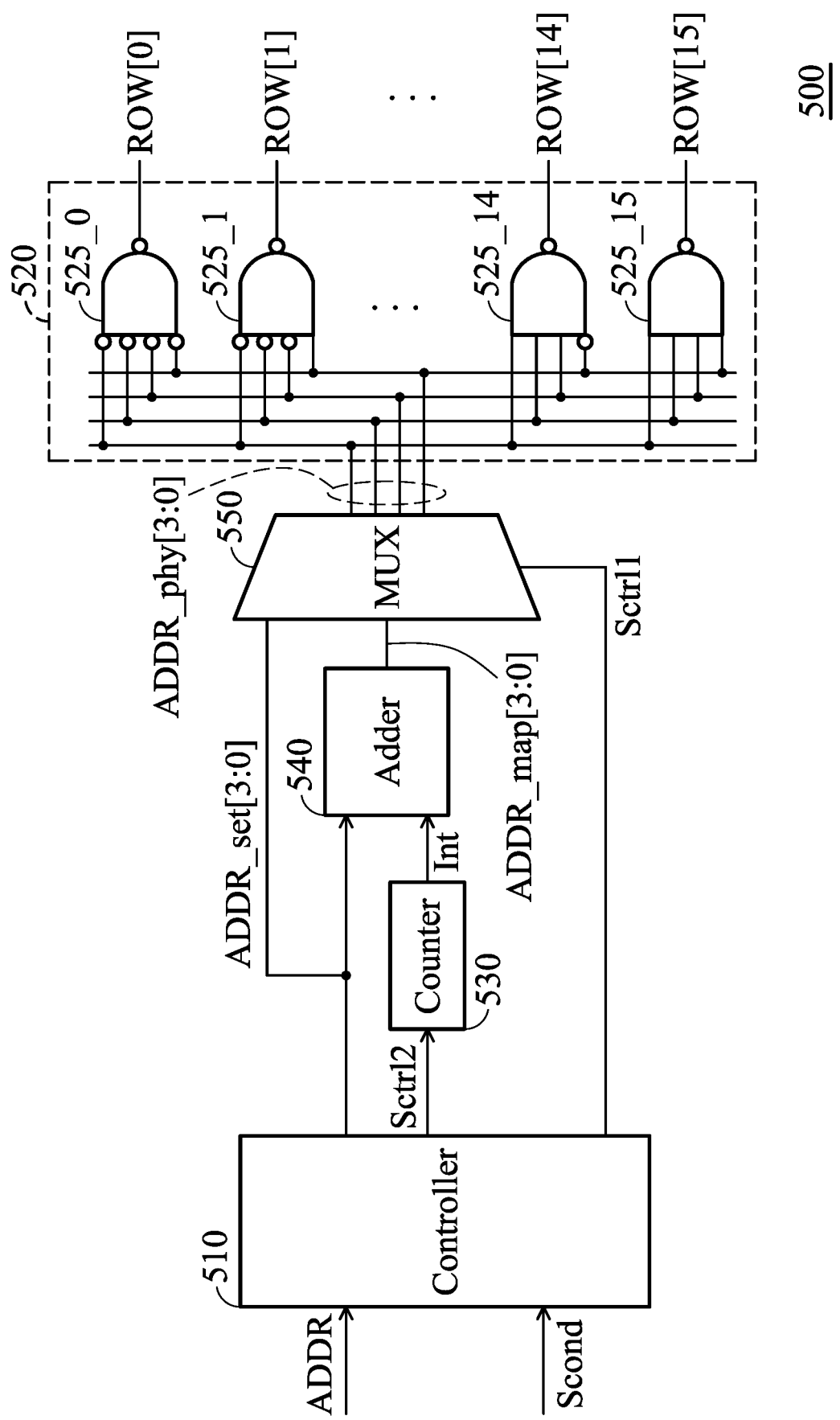
FIG. 5 shows an address decoder of a cache memory, in accordance with some embodiments of the disclosure.

FIG. 5 shows an address decoder 500 of a cache memory, in accordance with some embodiments of the disclosure. In the cache memory, all the sets are divided into a plurality of groups. In the embodiment, each group includes 16 sets. Similarly, each group includes 16 consecutive rows from row_0 to row_15 in sequence. It should be noted that the number of sets in each group is provided as an example, and is not intended to limit the disclosure. As described above, only a specific group of the cache memory is assigned at a time, and the configuration of the sets in the specific group is different from the configuration of the sets in groups other than the specific group (i.e. the unassigned groups).

The address decoder 500 includes a controller 510, a NAND array 520, a counter 530, an adder 540, and a multiplexer (MUX) 550. When a processor (e.g. 110 of FIG. 1) provides an access address ADDR to access the cache memory (e.g. 120 of FIG. 1), the controller 510 obtains a 4-bit set address ADDR_set[3:0] corresponding to a group to be accessed according to the access address ADDR. It should be noted that the bit number of the set address ADDR_set of the group to be accessed in the cache memory is provided as an example, and is not intended to limit the disclosure.

In some embodiments, the number of sets in each group of the cache memory is determined according to the bit number of the set address ADDR_set. For example, the bit number of the set address ADDR_set[3:0] is 4, and the number of sets in each group is equal to 16, i.e. 2 of the fourth power ($2^4$=16).

According to the access address ADDR, the controller 510 further provides a control signal Sctrl1 to indicate whether the access address ADDR corresponds to the specific group (i.e. the assigned group). In response to the control signal Sctrl1, the multiplexer 550 selectively provides the set address ADDR_set[3:0] or a mapping address ADDR_map[3:0] as a physical address ADDR_phy[3:0].

In some embodiments, when the control signal Sctrl1 indicates that the access address ADDR corresponds to the unassigned group, the multiplexer 550 provides the set address ADDR_set[3:0] as the physical address ADDR_phy [3:0], i.e. the set address ADDR_set[3:0] should not be mapped. Therefore, the set address ADDR_set[3:0] is directly provided to the NAND array 520 without through the counter 530 and the adder 540. Conversely, when the control signal Sctrl1 indicates that the access address ADDR corresponds to the specific group, the multiplexer 550 provides the mapping address ADDR_map[3:0] as the physical address ADDR_phy[3:0], i.e. the set address ADDR_set[3:0] should be mapped.

According to a control signal Scond, the controller 510 can provide a control signal Sctrl2 to the counter 530. In some embodiments, the control signal Scond is provided by the processor, and the control signal Scond is used to notice that a specific condition is present. In some embodiments, the specific condition indicates that a specific time period (e.g. one day, one month or one season) is reached or a specific program is performed. In some embodiments, the controller 510 can be implemented in the processor.

In some embodiments, the counter 530 can count the number of times that the specific condition occurs, and provide a value Int according to the number of times. In FIG. 5, the value Int is an integer between 1 and 15. In some embodiments, the counter 530 can increase the value Int by one in response to the control signal Scond. Furthermore, an initial value of the value Int can be determined according to the control signal Scond.

In some embodiments, the counter 530 may be a Gray counter, a number generator or a binary counter.

The adder 540 can add the value Int and the set address ADDR_set[3:0] to provide the mapping address ADDR_map[3:0]. Thus, the set address ADDR_set[3:0] is mapped as the mapping address ADDR_map[3:0]. The NAND array 520 is a decoder capable of decoding the physical address ADDR_phy[3:0] to obtain a 16-bit row line signal ROW[15:0].

Each bit of the row line signal ROW[15:0] is capable of controlling the corresponding row of the group to be accessed. When one bit of the row line signal ROW[15:0] is enabled, the row corresponding to the enabled bit of the row line signal is accessed. For example, the row line signal ROW[0] is used to control a row row_0 of the accessed group, the row line signal ROW[1] is used to control a row row_1 of the accessed group, . . . , and the row line signal ROW[15] is used to control the last row row_15 of the accessed group. It should be noted that the configurations of the rows are the same for all groups in the cache memory, such as those from row_0 to row_15 in sequence.

In the embodiment, the NAND array 520 includes 16 NAND gates 525_0 to 525_15. Each NAND gate has 4 inputs for respectively receiving the bits of the physical address ADDR_phy[3:0], and each NAND gate has an output for providing the individual bit of the row line signal ROW[15:0]. It should be noted that the NAND gates 525_0 to 525_15 of the NAND array 520 are used as an example to illustrate the function of the NAND array 520, and is not intended to limit the disclosure.

In some embodiments, the multiplexer 550 can be omitted. When determining that the access address ADDR corresponds to the unassigned group, the controller 510 can provide the control signal Sctrl2 to the counter 530, so as to control the counter 530 to provide the value Int with a zero value, i.e. Int=0. Due to the value Int being zero, the mapping address ADDR_map[3:0] is identical to the set address ADDR_set[3:0], e.g. ADDR_map=ADDR_set+0. Furthermore, when determining that the access address ADDR corresponds to the assigned group, the control signal Scond is used to notice the counter 530 that a specific condition is present. Therefore, the counter 530 can count the number of times that the specific condition occurs, so as to provide the value int with an integer corresponding to the number of times that were counted, as described above.

In some embodiments, each group of the cache memory has individual address decoder, such as the address decoder 500. Therefore, each address decoder corresponding to the unassigned group can provide the set address ADDR_set as the physical address ADDR_phy, so as to access the unassigned group. Furthermore, the address decoder corresponding to the assigned group can map the set address ADDR_set to provide the physical address ADDR_phy, so as to access the assigned group.

FIG. 6A shows an example table illustrating a relationship between the set address ADDR_set[3:0] and the row line signal ROW[15:0] of FIG. 5 when the unassigned group is accessed. In the embodiment, the sets are arranged in a regular order. For example, the set set_0 is arranged in the row row_0, the set set_1 is arranged in the row row_1, and so on. Furthermore, the set address ADDR_set[3:0] should not be mapped, i.e. ADDR_phy[3:0]=ADDR_set[3:0]. As described above, in some embodiments, the set address ADDR_set[3:0] is directly provided as the physical address ADDR_phy[3:0] by using at least one logic unit, such as a multiplexer (e.g. 550 of FIG. 5). In some embodiments, the physical address ADDR_phy[3:0] is obtained by incrementing the set address ADDR_set[3:0] by a zero value "0".

FIG. 6B shows an example table illustrating a relationship between the set address ADDR_set[3:0] and the row line signal ROW[15:0] of FIG. 5 when the specific group (i.e. the assigned group) is accessed. In the embodiment, by adding the value Int and the set address ADDR_set[3:0] to obtain the mapping address ADDR_map[3:0] (e.g. ADDR_map[3:0]=ADDR_set[3:0]+Int), the sets of the specific group are arranged in an adjustable order. The value Int can be an integer between 0 and 15 (2 to the power of 4 minus 1) in the example of 4-bit address. In FIG. 6B, the value of Int is "1". Furthermore, the adjustable order is changed in response to the control signal Sctrl2 of FIG. 4. In the embodiment, it is assumed that the value Int is 1, and the set set_0 is arranged in the row row_1, the set set_1 is arranged in the row row_2, . . . , and the set set_15 is arranged in the row row_0.

Figure 7:
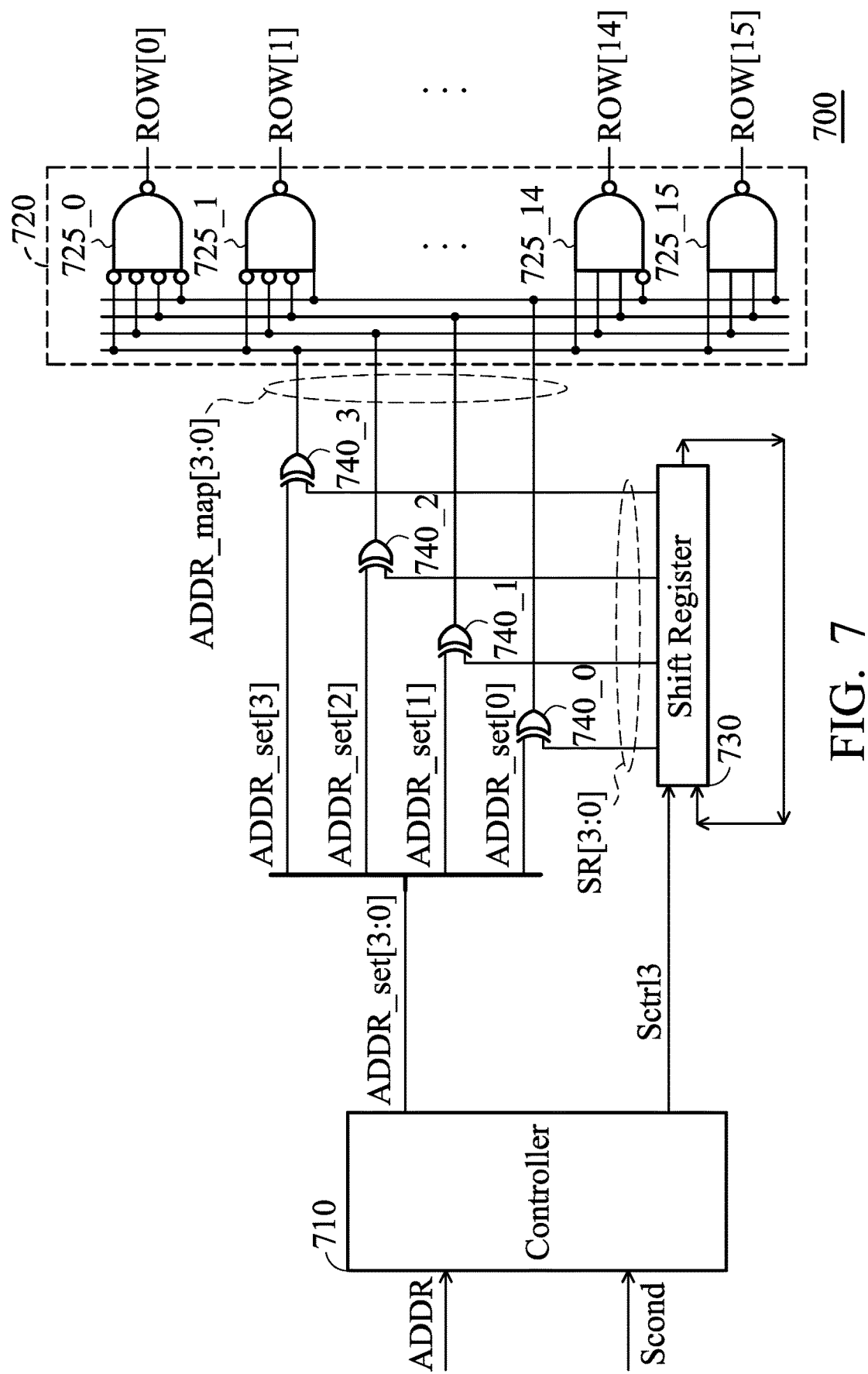
FIG. 7 shows an address decoder of a cache memory, in accordance with some embodiments of the disclosure.

FIG. 7 shows an address decoder 700 of a cache memory, in accordance with some embodiments of the disclosure. In the cache memory, all the sets are divided into a plurality of groups. In the embodiment, each group includes 16 sets. Similarly, each group includes 16 consecutive rows from row_0 to row_15 in sequence. It should be noted that the number of sets in each group is provided as an example, and is not intended to limit the disclosure. As described above, only a specific group of the cache memory is assigned at a time, and the configuration of the sets in the specific group is different from the configuration of the sets in groups other than the specific group (i.e. the unassigned groups).

The address decoder 700 includes a controller 710, a NAND array 720, a shift register 730, and a plurality of XOR gates 740_0 to 740_3. In order to simplify the description, a multiplexer (e.g. 550 of FIG. 5) is omitted.

When a processor (e.g. 110 of FIG. 1) provides an access address ADDR to access the cache memory (e.g. 120 of FIG. 1), the controller 710 obtains a 4-bit set address ADDR_set [3:0] of a group to be accessed according to the access address ADDR. It should be noted that the bit number of the set address ADDR_set of the group to be accessed in the cache memory is provided as an example, and is not intended to limit the disclosure.

In some embodiments, the number of sets in each group of the cache memory is determined according to the bit number of the set address ADDR_set. For example, the bit number of the set address ADDR_set[3:0] is 4, and the number of sets in each group is equal to 16, i.e. 2 of the fourth power (24=16).

According to the access address ADDR, the controller 710 provides a control signal Sctrl3 to indicate whether the access address ADDR corresponds to the specific group (i.e. the assigned group). In some embodiments, the control signal Scond is provided by the processor, and the control signal Scond is used to notice that a specific condition is present. In some embodiments, the specific condition indicates that a specific time period (e.g. one day, one month or one season) is reached or a specific program is performed. In some embodiments, the controller 710 can be implemented in the processor.

If the control signal Sctrl3 indicates that the access address ADDR corresponds to the specific group (i.e. the assigned group), a shift value SR[3:0] is provided to the XOR gates 740_0 to 740_3 by the shift register 730. Each of the XOR gates 740_0 to 740_3 has a first input for receiving an individual bit of the set address ADDR_set[3:0], a second input for receiving an individual bit of the shift value SR[3:0].

In the embodiment, only one bit of the shift value SR[3:0] is at a high logic level, and the remaining bits of the shift value SR[3:0] are at a low logic level, i.e. a one-bit "1" is shifted by the shift register 730. Specifically, one bit of the set address ADDR_set[3:0] is inverted at a time. Therefore, the XOR gates 740_0 to 740_3 can map the set address ADDR_set according to the shift value SR[3:0], to obtain the mapping address ADDR_map.

According to the control signal Scond, the controller 710 further provides the control signal Sctrl3 to the shift register 730. In some embodiments, the control signal Scond is provided by the processor, and the control signal Scond is used to notice that a specific condition is present. In some embodiments, the specific condition indicates that a specific time period (e.g. one day, one month or one season) is reached or a specific program is performed.

If the control signal Sctrl3 indicates that the access address ADDR corresponds to an unassigned group, the shift value SR[3:0] is reset and a zero value "0" is provided to the XOR gates 740_0 to 7403, i.e. SR[3:0]=0. Therefore, the XOR gates 740_0 to 740_3 cannot map the set address ADDR_set, i.e. the mapping address ADDR_map is identical to the set address ADDR_set.

Each bit of the row line signal ROW[15:0] is capable of controlling the corresponding row of the group to be accessed. When one bit of the row line signal ROW[15:0] is enabled, the row corresponding to the enabled bit of the row line signal is accessed. For example, the row line signal ROW[0] is used to control a row row_0 of the accessed group, the row line signal ROW[1] is used to control a row row_1 of the accessed group . . . , and the row line signal ROW[15] is used to control the last row row_15 of the accessed group. It should be noted that the configurations of the rows are the same for all the groups in the cache memory, such as those from row_0 to row_15 in sequence.

In the embodiment, the NAND array 720 includes 16 NAND gates 725_0 to 725_15. Each NAND gate has 4 inputs for respectively receiving the bits of the mapping address ADDR_map[3:0], and each NAND gate has an output for providing the individual bit of the row line signal ROW[15:0]. It should be noted that the NAND gates 725_0 to 72515 of the NAND array 720 are used as an example to illustrate the function of the NAND array 720, and are not intended to limit the disclosure.

In some embodiments, each group of the cache memory has individual address decoder, such as the address decoder 700. Therefore, each address decoder corresponding to the unassigned group can provide the set address ADDR_set as the physical address ADDR_phy, so as to access the unassigned group. Furthermore, the address decoder corresponding to the assigned group can map the set address ADDR_set to provide the physical address ADDR_phy, so as to access the assigned group.

It should be noted that there can be many different ways to map the the set address ADDR_set. To optimize the circuits used in implementing the complete address bits mapping and decoder logic to map and decode can be combined and reduced.

FIG. 8A shows an example table illustrating a relationship between the set address ADDR_set[3:0] and the row line signal ROW[15:0] of FIG. 7 when the accessed group is the assigned group and the shift value SR[3:0] is "0001". In the embodiment, the set set_0 is arranged in the row row_1, and the set set_1 is arranged in the row row_0. Furthermore, the set set_2 is arranged in the row row_3, and the set set_3 is arranged in the row row_2, and so on.

FIG. 8B shows an example table illustrating a relationship between the set address ADDR_set[3:0] and the row line signal ROW[15:0] of FIG. 7 when the accessed group is the assigned group and the shift value SR[3:0] is "0010". In the embodiment, the set set_0 is arranged in the row row_2, and the set set_1 is arranged in the row row_3. Furthermore, the set set_2 is arranged in the row row_0, and the set set_3 is arranged in the row row_1, and so on.

FIG. 8C shows an example table illustrating a relationship between the set address ADDR_set[3:0] and the row line signal ROW[15:0] of FIG. 7 when the accessed group is the assigned group and the shift value SR[3:0] is "0100". In the embodiment, the set set_0 is arranged in the row row_4, and the set set_1 is arranged in the row row_5. Furthermore, the set set_2 is arranged in the row row_6, and the set set_3 is arranged in the row row_7, and so on.

FIG. 8D shows an example table illustrating a relationship between the set address ADDR_set[3:0] and the row line signal ROW[15:0] of FIG. 7 when the accessed group is the assigned group and the shift value SR[3:0] is "1000". In the embodiment, the set set_0 is arranged in the row row_8, and the set set_1 is arranged in the row row_9. Furthermore, the set set_2 is arranged in the row row_10, and the set set_3 is arranged in the row row_1, and so on.

Embodiments for dynamically changing the set address mapping of a cache memory are provided. The cache memory is divided into a plurality of groups, and each group includes a plurality of sets. One group of the groups is assigned at a time. The set address mapping function is changeable in the assigned group. Therefore, the sets of the assigned group are arranged in a set order different from that of the sets of the unassigned groups. The groups are round robin assigned one group at a time. According to the embodiments, dynamically mapping the set address of the cache memory can distribute the accesses amount a subgroup of sets, so as to avoid "hot set" which may cause memory cells to degrade and fail in its life time. Furthermore, according to the embodiments, a dynamic mapping of one group can be implemented in an integrated circuit for various types of memories, such as SRAM, MRAM, and so on.

In some embodiments, an integrated circuit (IC) is provided. The IC includes a cache memory divided into a plurality of groups, and an address decoder. Each of the groups includes a plurality of sets, and the groups are assigned in rotation for a plurality of time periods. Each of the groups is assigned in a corresponding single one of the time periods. The address decoder is configured to obtain a set address according to an access address and provide a physical address according to the set address. When the access address corresponds to a first group of the groups of the cache memory, the physical address is different from the set address. When the access address corresponds to the groups other than the first group, the physical address is the same as the set address. The sets of the first group that is assigned in a first time period are not overlapping with the sets of other first groups that are assigned in the time periods other than the first time period.

In some embodiments, an integrated circuit (IC) is provided. The IC includes a cache memory divided into a plurality of groups, a processor, and an address decoder. Each of the groups includes a plurality of sets. The processor is configured to provide a control signal to assign one of the groups in a specific sequence for a plurality of time periods. Each of the groups is assigned in a corresponding single one of the time periods. The address decoder is configured to receive an access address of the cache memory and to selectively provide the access address or a mapping address to the cache memory according to the control signal. When the access address corresponds to the assigned group of the groups of the cache memory, the address decoder is configured to provide the mapping address to the assigned group in the cache memory. When the access address corresponds to an unassigned group of the cache memory, the address decoder is configured to provide the access address to the unassigned group of the cache memory, and the unassigned group of the cache memory is one of the groups other than the assigned group in the cache memory. The mapping address of the assigned group that is assigned in a first time periods is different from the mapping address of other assigned groups that are assigned in the time periods other than the first time period.

In some embodiments, an address mapping method of a cache memory is provided. A plurality of sets of the cache memory are divided into a plurality of groups. The groups are assigned in rotation for a plurality of time periods, wherein each of the groups is assigned in a corresponding single one of the time periods. The cache memory is accessed according to an access address when the access address corresponds to the groups other than the assigned group in the cache memory. The access address is changed to obtain a physical address. The cache memory is accessed according to the physical address when the access address corresponds to the assigned group in the cache memory. The sets of the assigned group that is assigned in a first time period are not overlapping with the sets of other assigned groups that are assigned in the time periods other than the first time period.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated circuit (IC), comprising:
   a cache memory divided into a plurality of groups, wherein each of the groups comprises a plurality of sets, wherein the groups are assigned in rotation for a plurality of time periods, and each of the groups is assigned in a corresponding single one of the time periods; and
   an address decoder configured to obtain a set address according to an access address and provide a physical address according to the set address,
   wherein when the access address corresponds to a first group of the groups of the cache memory, the physical address is different from the set address, and when the access address corresponds to the groups other than the first group, the physical address is the same as the set address,
   wherein the sets of the first group that is assigned in a first time period are not overlapping with the sets of other first groups that are assigned in the time periods other than the first time period.

2. The IC as claimed in claim 1, wherein the cache memory is a set-associative cache memory.

3. The IC as claimed in claim 2, wherein the sets of the first group of the cache memory are arranged in a first set order, and the sets of each of the groups of the cache memory other than the first group are arranged in a second set order different from the first set order.

4. The IC as claimed in claim 1, wherein the cache memory comprises a plurality of memory cells arranged in an array, and each of the groups comprises the memory cells arranged in N consecutive rows of the array, wherein each of the rows of the group has an individual physical address.

5. The IC as claimed in claim 4, the address decoder decodes the physical address to provide a row line signal with a plurality of bits to the group corresponding to the access address, wherein each of the rows of the group is controlled by an individual bit of the row line signal.

6. The IC as claimed in claim 1, wherein the address decoder comprises:
   a number generator, generating an integer, wherein the integer is smaller than N; and
   an adder, adding the integer and the access address to provide the physical address when the access address corresponds to the first group in the cache memory.

7. The IC as claimed in claim 6, wherein when a specific condition is present, the number generator adjusts a value of the integer.

8. The IC as claimed in claim 1, wherein the address decoder comprises:
   a plurality of XOR gates, each having a first input for receiving an individual bit of the access address, a second input, and an output for providing an individual bit of the physical address; and
   a shift register, providing a high logic signal to the second input of one of the XOR gates, and a plurality of low logic signals to the second inputs of the remaining XOR gates.

9. The IC as claimed in claim 8, wherein when a specific condition is present, the shift register provides the high logic signal to the second input of another XOR gate, and the low logic signals to the second inputs of the remaining XOR gates.

10. An integrated circuit (IC), comprising:
a cache memory divided into a plurality of groups, wherein each of the groups comprises a plurality of sets;
a processor configured to provide a control signal to assign one of the groups in a specific sequence for a plurality of time periods, wherein each of the groups is assigned in a corresponding single one of the time periods; and
an address decoder configured to receive an access address of the cache memory and to selectively provide the access address or a mapping address to the cache memory according to the control signal,
wherein when the access address corresponds to the assigned group of the groups of the cache memory, the address decoder is configured to provide the mapping address to the assigned group in the cache memory,
wherein when the access address corresponds to an unassigned group of the cache memory, the address decoder is configured to provide the access address to the unassigned group of the cache memory, and the unassigned group of the cache memory is one of the groups other than the assigned group in the cache memory,
wherein the mapping address of the assigned group that is assigned in a first time periods is different from the mapping address of other assigned groups that are assigned in the time periods other than the first time period.

11. The memory as claimed in claim 10, wherein the cache memory is a set-associative cache memory.

12. The IC as claimed in claim 11, wherein the sets of the assigned group of the cache memory are arranged in a first set order, and the sets of each of the unassigned groups of the cache memory are arranged in a second set order different from the first set order.

13. The IC as claimed in claim 10, wherein the cache memory comprises a plurality of memory cells arranged in an array, and each of the groups comprises the memory cells arranged in N consecutive rows of the array, wherein each of the rows of the unassigned group has the individual access address, and each of the rows of the assigned group has the individual mapping address.

14. The IC as claimed in claim 10, wherein the address decoder comprises:
a number generator, generating an integer according to the first control signal from the processor, wherein the integer is smaller than N; and
an adder, adding the integer and the access address to provide the mapping address when the access address corresponds to the assigned group in the cache memory.

15. The IC as claimed in claim 14, wherein when a specific condition is present, the number generator adjusts the value of the integer.

16. The IC as claimed in claim 10, wherein the address decoder comprises:
a plurality of XOR gates, each having a first input for receiving an individual bit of the access address, a second input, and an output for providing an individual bit of the mapping address; and
a shift register, providing a high logic signal to the second input of one of the XOR gates, and a plurality of low logic signals to the second inputs of the remaining XOR gates, wherein the one of the XOR gates is determined according to the first control signal.

17. The IC as claimed in claim 16, wherein when a specific condition is present, the shift register provides the high logic signal to the second input of another XOR gate, and the low logic signals to the second inputs of the remaining XOR gates.

18. An address mapping method of a cache memory, comprising:
dividing a plurality of sets of the cache memory into a plurality of groups;
assigning the groups in rotation for a plurality of time periods, wherein each of the groups is assigned in a corresponding single one of the time periods;
accessing the cache memory according to an access address when the access address corresponds to the groups other than the assigned group in the cache memory;
changing the access address to obtain a physical address; and
accessing the cache memory according to the physical address when the access address corresponds to the assigned group in the cache memory,
wherein the sets of the assigned group that is assigned in a first time period are not overlapping with the sets of other assigned groups that are assigned in the time periods other than the first time period.

19. The address mapping method as claimed in claim 18, wherein the cache memory is a set-associative cache memory.

20. The address mapping method as claimed in claim 18, wherein the step of assigning the one of the groups in rotation further comprises:
arranging the sets of the assigned group of the cache memory in a first set order; and
arranging the sets of each of the unassigned groups of the cache memory in a second set order different from the first set order.

* * * * *